United States Patent
Chang et al.

(10) Patent No.: US 9,678,196 B2
(45) Date of Patent: Jun. 13, 2017

(54) SENSOR FOR DETECTING PARKING LOT

(71) Applicant: U&U ENGINEERING INC, Taipei (TW)

(72) Inventors: Chi-Ho Chang, Taipei (TW); Chien-Pien Hsieh, Taipei (TW); Chao-Fu Chiang, Taipei (TW); Ping-Chang Tsao, Taipei (TW)

(73) Assignee: U&U ENGINEERING INC, Taipei (TW)

( * ) Notice: Subject to any disclaimer, the term of this patent is extended or adjusted under 35 U.S.C. 154(b) by 223 days.

(21) Appl. No.: 14/788,817

(22) Filed: Jul. 1, 2015

(65) Prior Publication Data

US 2016/0306028 A1    Oct. 20, 2016

(30) Foreign Application Priority Data

Apr. 15, 2015   (TW) ............................ 104112131 A

(51) Int. Cl.
*G01S 13/34*   (2006.01)
*G01S 7/03*    (2006.01)
(Continued)

(52) U.S. Cl.
CPC .............. *G01S 7/032* (2013.01); *G01S 7/354* (2013.01); *G01S 13/04* (2013.01); *G01S 13/34* (2013.01);
(Continued)

(58) Field of Classification Search
CPC .......... G01S 7/032; G01S 7/354; G01S 13/04; G01S 13/342; G01S 2013/462; G08G 1/142; G08G 1/149
See application file for complete search history.

(56) References Cited

U.S. PATENT DOCUMENTS 4,456,911 A * 6/1984 Augustine ............... G01S 13/04
                                                     342/122
9,013,326 B2 * 4/2015 Desiderio ............... G01S 7/003
                                                     340/425.5
(Continued)

FOREIGN PATENT DOCUMENTS

TW           I333636 B     11/2010
TW        201439575 A     10/2014
(Continued)

*Primary Examiner* — Sara Samson
(74) *Attorney, Agent, or Firm* — Mark M. Friedman

(57) ABSTRACT

A sensor for detecting a parking space includes a modulating module for supplying a sinusoid wave having a modulation frequency, an active antenna module transmits a FMCW signal based on the modulation frequency and for receiving a reflected FMCW signal, a intermediate-frequency filter for extracting a first demodulating signal having the modulation frequency from the reflected FMCW signal generating modulation signal, a second intermediate-frequency filter for extracting a second demodulating signal having a multiplying frequency of the modulation frequency, an integrator for performing integral operation for the second demodulating signal to generate an integral voltage, a triggering circuit for generating a triggering voltage when the integral voltage is greater than a reference voltage, and a controller for performing operations relating to an existence of a vehicle when receiving the triggering voltage.

10 Claims, 9 Drawing Sheets

(51) Int. Cl.
    *G01S 7/35*         (2006.01)
    *G01S 13/04*       (2006.01)
    *G08G 1/14*        (2006.01)
    *G01S 13/46*       (2006.01)

(52) U.S. Cl.
    CPC .............. *G08G 1/142* (2013.01); *G08G 1/149* (2013.01); *G01S 2013/462* (2013.01)

(56) References Cited

U.S. PATENT DOCUMENTS

| | | | |
|---|---|---|---|
| 2013/0229116 A1* | 9/2013 | Van Zeijl | H05B 37/0227 315/153 |
| 2014/0103815 A1* | 4/2014 | Chai | H05B 37/0227 315/158 |
| 2014/0218527 A1* | 8/2014 | Subramanya | G08G 1/143 348/148 |
| 2016/0047908 A1* | 2/2016 | Wagner | G01S 7/352 342/21 |

FOREIGN PATENT DOCUMENTS

TW         201508302 A     3/2015
WO       2013142056 A1   9/2013

\* cited by examiner

SENSOR FOR DETECTING PARKING LOT

BACKGROUND OF THE INVENTION

1. Field of the Invention

The present invention relates to a microwave sensor, and more specifically, to a sensor adopting frequency-modulated continuous wave (FMCW) for detecting whether the parking spaces are occupied.

2. Description of the Prior Art

The design of existing indoor parking lot detection sensors mostly adopts infrared as the sensing device. For example, the Taiwan patent no. I333636 disclose a parking space detection sensor for detecting whether a specific parking space is taken based on whether the emitting and receiving of infrared beams through reflecting units are interrupted not or. Please refer to FIG. 9, which shows a schematic diagram of how the existing technology detects a parking space. When the parking space is empty, a light-emitting unit 12 emits infrared beams to a reflecting unit 14 that reflects the beams to a light-sensing unit 16. However, when the parking space is taken by an object standing between the light-emitting unit 12 and light reflecting unit 14, the infrared beams are interrupted and cannot travel from the light-emitting unit 12 to the light reflecting unit 14. Therefore the light-sensing unit 16 cannot detect any infrared beam being reflected.

The existing detecting device makes use of infrared beam sensors, which generally are suitable for an indoor parking lot management system. Given that a fixed distance must be maintained from the light-emitting unit 12 and light-sensing unit 16 to the light reflecting unit 14, the light-emitting unit 12 and light-sensing unit 16 usually sit on overhead installations such as the steel racks of the ceiling or the steel utility pipes in the basement. Therefore, the requirements of overhead installation and reflection angle are limits of the existing technology that adopts infrared beam sensors to detect the availability of a parking space.

Besides, additional overhead installation is needed if the existing infrared beam sensor is to be used in an outdoor parking lot. And, weather conditions, such as rain or heavy fog, or environmental factors, such as dust or sludge, influence the effect of infrared beam detection.

Therefore, it is extremely important to provide a sensor for detecting a parking space not subject to the interference of weather conditions or environmental factors indoors or outdoors.

SUMMARY OF THE INVENTION

An object of the present invention is to provide a microwave sensor as a sensor for detecting a parking space. A microwave sensor is not interfered by weather conditions or environmental factors indoors or outdoors. Meanwhile, the sensor for detecting a parking space can provide an accurate sensing method to check whether there is still empty parking space.

According to the present invention, a sensor for detecting a parking space comprises a modulating module, an active antenna, a first intermediate-frequency filter, a second intermediate-frequency filter, an integrator, a triggering circuit, and a controller. The modulating module is used for providing sinusoid waves having a modulation frequency. The active antenna is electrically connected to the modulating module for transmitting a first frequency-modulated continuous wave (FMCW) signal based on the modulation frequency, and receiving a second FMCW signal that is reflected back. The first intermediate-frequency filter is electrically connected to the active antenna module and is used for extracting a first demodulating signal form the second FMCW signal, with the first demodulating signal having the modulation frequency. The second intermediate-frequency filter is electrically connected to the first intermediate-frequency filter, and is used for extracting a second demodulating signal from the first demodulating signal, with the second demodulating signal having a triggering bandwidth being a multiplying frequency of the modulation frequency. The integrator is electrically connected to the second intermediate-frequency filter, and is used for performing integral operation to the second demodulating signal to output an integral voltage. The triggering circuit is electrically connected to the integrator, and is used to output a triggering voltage when the integral voltage of the second demodulating signal is larger than a reference voltage. The controller is electrically connected to the triggering circuit and is used to execute the operation signaling a parking space is taken when receiving the triggering voltage.

In one aspect of the present invention, the active antenna module comprises a loop antenna and a radio frequency (RF) transistor. The loop antenna comprises a transmitting terminal for transmitting the first FMCW signal and a receiving terminal for transmitting the second FMCW signal. The radio frequency (RF) transistor comprises a controlling port, a first port, and a second port. The second port is coupled to the transmitting terminal. The controlling terminal is coupled to the receiving terminal. Signal applied on the controlling terminal is an inversed phase of signal applied on the second port.

In another aspect of the present invention, the RF transistor is a bipolar junction transistor (BJT). The controlling port is a base, the first port is an emitter, and the second port is a collector.

In another aspect of the present invention, the RF transistor is a field effect transistor (FET). The FET comprises a P-Hemt. The controlling port is a gate, the first port is a source, and the second port is a drain.

In another aspect of the present invention, the microwave sensor further comprises a first capacitor. The first capacitor comprises two terminals bridging over the first port and the second port of the RF transistor. The loop antenna comprises a first inductor, coupled to the second port of the RF transistor, a second inductor, a third inductor coupled to the controlling port of the RF transistor, a second capacitor coupled between the first inductor and the second inductor, and a third capacitor coupled between the second inductor and the third inductor.

In another aspect of the present invention, the active antenna module comprises a substrate. The substrate comprises a first surface and a second surface facing against the first surface, a first metal microstrip antenna disposed on the first surface of the substrate, a second metal microstrip antenna disposed on the first surface of the substrate, a third metal microstrip antenna, disposed on the first surface of the substrate, a first coupling metallic sheet, disposed on the second surface of the substrate, a second coupling metallic sheet, disposed on the second surface of the substrate, and a third coupling metallic sheet, disposed on the second surface of the substrate. The RF transistor is disposed on the first surface of the substrate. The controlling port of the RF transistor is connected to the third metal microstrip antenna, and the first port and the second port are connected to the first coupling metallic sheet and the first metal microstrip antenna, respectively. A first part of the first metal microstrip antenna and the first coupling metallic sheet form a first capacitor, a second part of the first metal microstrip antenna, a first part of the second metal microstrip antenna adjacent to the first part of the first metal microstrip antenna, and the second coupling metallic sheet form a third capacitor, a second part of the second metal microstrip antenna, the third metal microstrip antenna adjacent to the second part of the second metal microstrip antenna, and the third coupling metallic sheet form a third capacitor.

In another aspect of the present invention, the triggering frequency is eight to ten times the frequency band of the modulation frequency.

In another aspect of the present invention, the sensor for detecting a parking space is located on the surface of the parking space, or maintains a predetermined distance above the parking space.

In another aspect of the present invention, the sensor for detecting a parking space further comprises a switch that electrically connects the modulating module and the controller, which outputs a switch signal when receiving the triggering voltage. The switch controls the modulating module to temporarily stop outputting the sinusoid wave when receiving the control signal.

In another aspect of the present invention, the switch, when receiving the control signal, switches the modulating module to output a voltage of direct current.

Comparing with the existing technology, the small microwave sensor adopted by the present invention is applied to detect objects that are within an extremely short distance (within one meter). The present invention integrates the oscillator, mixer and antenna of a radiofrequency (RF) module, simplifies and further reduces the size of the RF transceiver. Meanwhile, the voltage-controlled oscillator (VCO) and the mixer is substituted by a bipolar junction transistor (BJT) or field-effect transistor (FET, e.g. P-Hemt), significantly improves the size and power consumption. Therefore, the sensor for detecting a parking space of the present invention can easily integrate with the circuit of the existing solar-powered lighting equipment outdoors and serve as a parking lot sensor for outdoor parking lots or on-street parking areas. It helps to achieve smart parking management and application in urban areas.

In addition, the modulating module of the present invention outputs a modulation signal generated by sinusoid waves. The Bessel function of the modulation signal generated by taking sinusoid wave as the modulation frequency comprises the distribution of odd-order terms and even-order terms. A high-order distortion harmonic of the first demodulating signal generated by demodulating the modulation frequency, after saturation, can demodulate a second demodulating signal. The present invention adopts the second demodulating signal as the basis for object detection, which is different from the short-distance detection of the conventional frequency-modulated continuous wave (FMCW). The sensor for detecting parking lots is not interfered by weather conditions or environmental factors indoors or outdoors, and can provide an accurate detection method so that drivers can easily know which parking space is empty.

These and other features, aspects and advantages of the present disclosure will become understood with reference to the following description, appended claims and accompanying figures.

DETAILED DESCRIPTION OF THE PREFERRED EMBODIMENTS

Figure 1A:
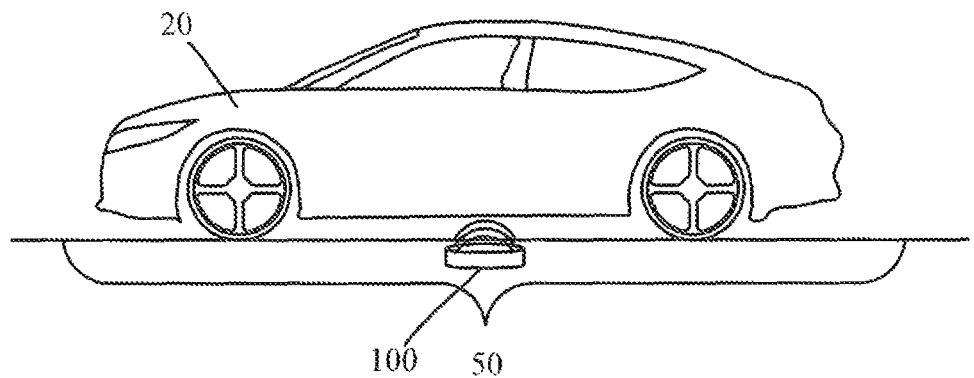
FIG. 1A and FIG. 1B are schematic diagrams of a sensor for detecting a parking lot and a car.
Figure 1B:
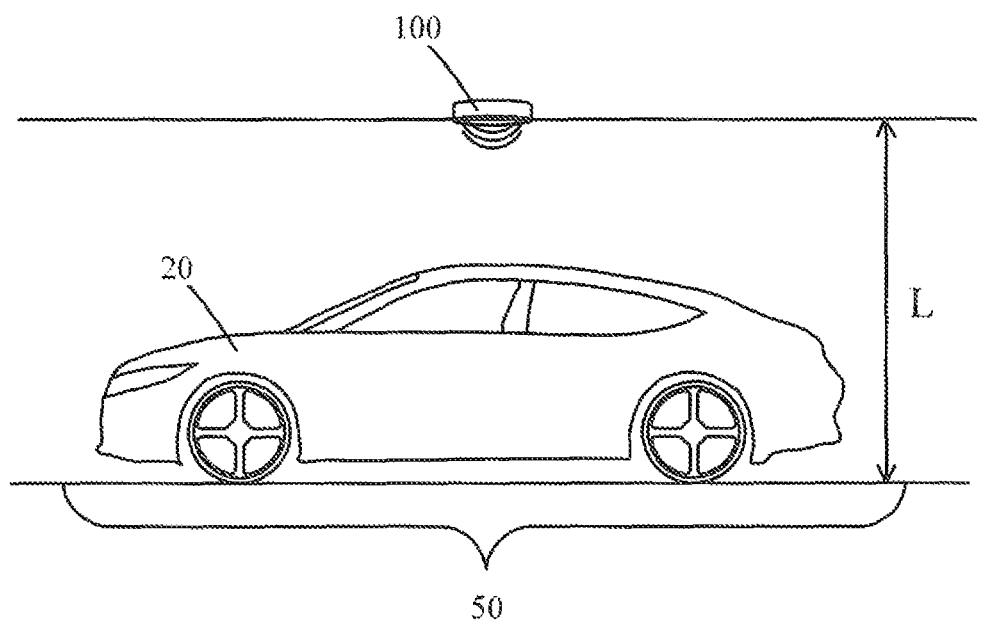

Please refer to FIGS. 1A and 1B. FIG. 1A and FIG. 1B are schematic diagrams of a sensor 100 for detecting a parking space and a car 20. The sensor 100 for detecting a parking space uses a small microwave detector to detect whether a parking space is occupied by the car 20. Whether indoors or outdoors, the sensor 100 for detecting a parking space can be installed on the surface of a parking space 50, or a predetermined distance L above the parking space 50. The predetermined distance L, preferably, is within two meters. Preferably, the sensor 100 for detecting a parking space sits in the center of the parking space 50, and sets the detecting distance at one meter, so to avoid being interfered by the reflecting signal of a car 20 at a neighboring parking space 50.

Figure 2:
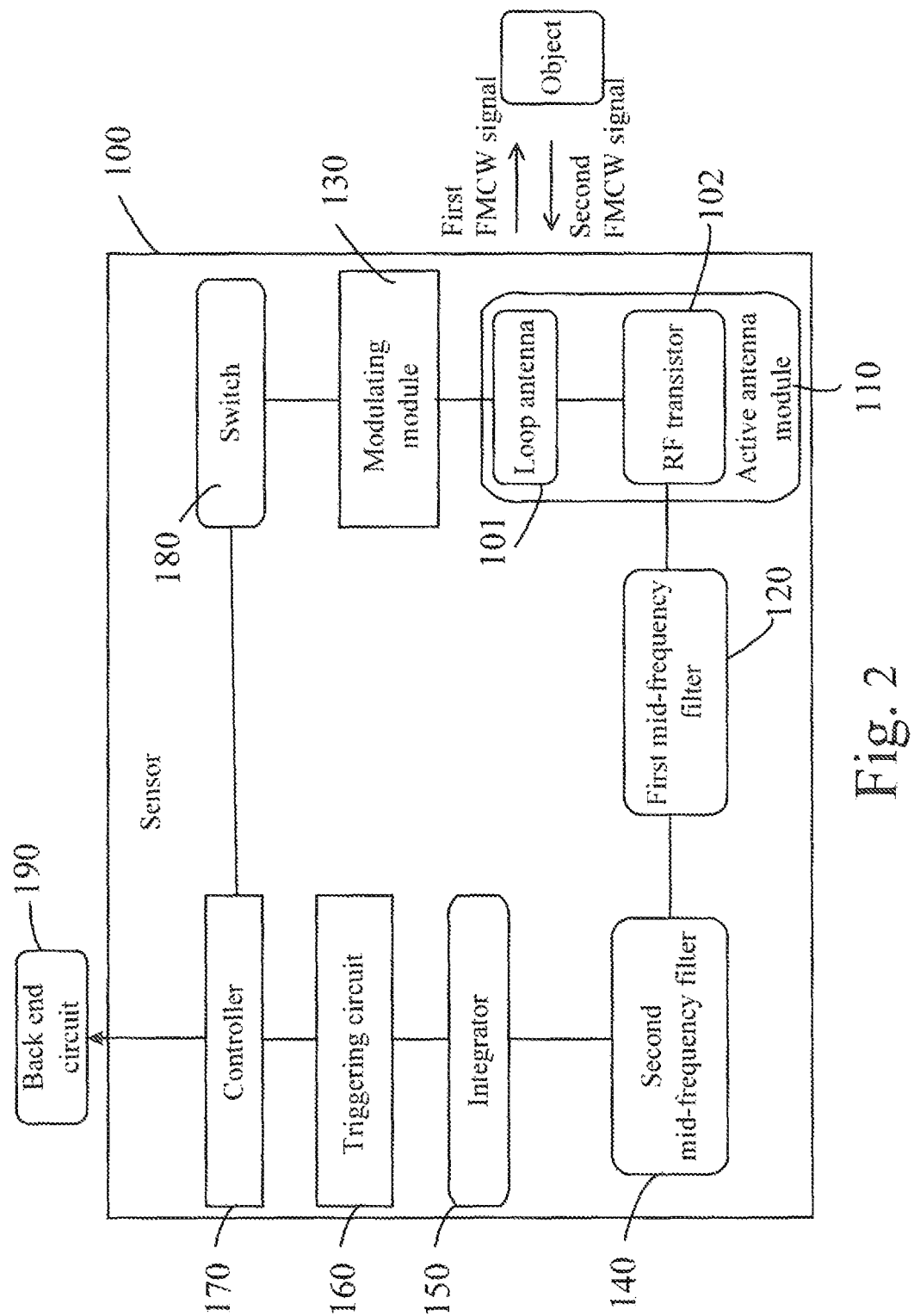
FIG. 2 shows a functional block diagram of the sensor for detecting a parking space according to a preferred embodiment of the present invention.

Please refer to FIG. 2, showing a functional block diagram of the sensor 100 for detecting a parking space according to a preferred embodiment of the present invention. The sensor 100 for detecting a parking space comprises an active antenna 110, an intermediate-frequency filter 120, a modulating module 130, a second intermediate-frequency filter 140, an integrator 150, a triggering circuit 160, a controller 170 and a switch 180. The modulating module 130 is used to provide a sinusoid wave having a modulation frequency $f_m$. The active antenna module 110, integrating the functions of an antenna and a RF module, comprises a loop antenna 101 and a RF transistor 102. The loop antenna 101 transmits a first FMCW signal based on the modulation frequency $f_m$, and receives a second FMCW signal that is reflected back. The first intermediate-frequency filter 120 electrically connects the active antenna module 110 to extract a first demodulating signal from the second FMCW signal. The first demodulating signal has the modulation frequency $f_m$. The second intermediate-frequency filter 140 electrically connects the first intermediate-frequency filter 120 to extract a harmonic signal from the first demodulating signal as a second demodulating signal, whose frequency is a predetermined multiplying frequency of $f_m$. The integrator 150 electrically connects the second intermediate-frequency filter 140 and performs integral operation to the second demodulating signal to output an integral voltage. The triggering circuit 160 electrically connects the integrator 150 to output a triggering voltage when the integral voltage of the second demodulating signal is larger than a reference voltage. The controller 170 electrically connects the triggering circuit 160 to perform the operation signaling that the parking space 50 is taken when the triggering voltage is received. A detailed description of the structure and operation of each element will be provided hereafter.

The modulating module 130 generates a sinusoid wave having the modulation frequency $f_m$. The sinusoid wave is a modulation signal. The RF bandwidth $\Delta f$ of the first FMCW signal is directly affected by the amplitude of the modulation signal. It becomes higher when the amplitude of the modulation bandwidth is wider, and lower when the amplitude of the modulation bandwidth is narrower. Therefore, when the sensor 100 for detecting a parking space needs to expand the detection area, the RF bandwidth $\Delta f$ of the first FMCW signal must be decreased. On the contrary, when the sensor 100 for detecting a parking space needs to reduce the detection area, the RF bandwidth $\Delta f$ of the first FMCW signal must be increased. Preferably, the detection area of the sensor 100 for detecting a parking space is within one meter.

Figure 3:
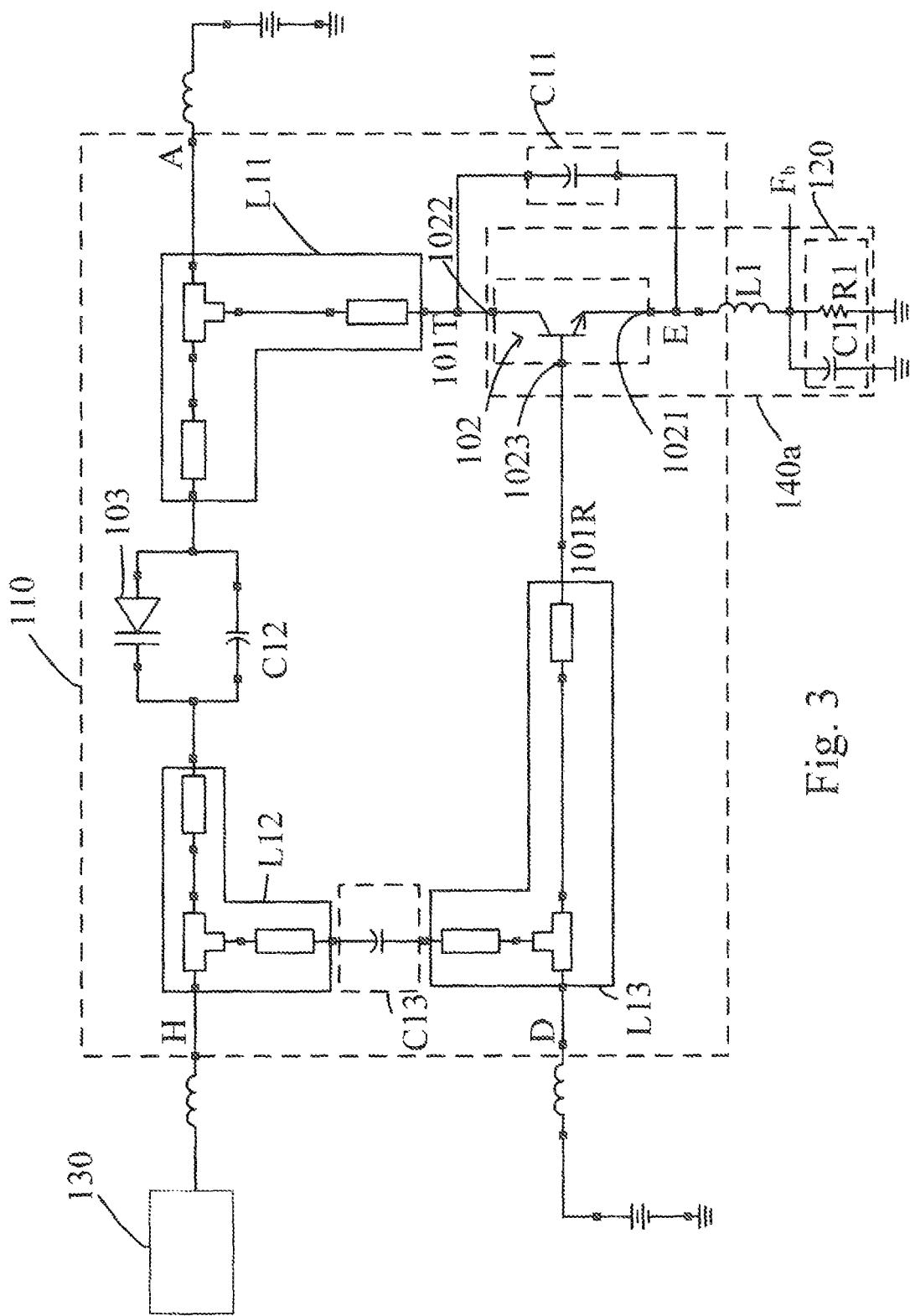
FIG. 3 is an equivalent circuit of the active antenna module in FIG. 2.

Please refer to FIG. 3, FIG. 3 is an equivalent circuit of the active antenna module in FIG. 2. The active antenna module 110, having self-mixing and self-demodulation architecture, comprises the loop antenna 101 and the radio frequency transistor 102. The loop antenna 101 has a transmitting terminal 101T and a receiving terminal 101R. The transmitting terminal 101T is utilized for transmitting the first FMCW signal, and the receiving terminal 101R is utilized for transmitting the second FMCW signal. The loop antenna 101 comprises a first inductor L11, a second inductor L12, a third inductor L13, a first capacitor C12, a second capacitor C13, a third capacitor C13, and a varactor 103. The first capacitor C11, the second capacitor C12, and the third capacitor C13 are coupling capacitors formed by metallic sheets. The radio frequency transistor 102 has a control port 1023, a first port 1021, and a second port 1022. The second port 1022 is coupled to the transmitting terminal 101T, and the control port 1023 is coupled to the receiving terminal 101R. The first port 1021 and the second port 1022 are connected to two ends of the first capacitor C12. The first port 1021 is electrically connected to the first low pass filter 120 and is used as the output terminal for an intermediate frequency (baseband) demodulation signal. The varactor 103 and the second capacitor C13 are connected in parallel.

It is worth noticing that, in FIG. 3, there must be a 180-degree phase difference between the transmitting terminal 101T and the receiving terminal 101R to form a positive feedback circuit so as to obtain good oscillation. In the figure, the radio frequency transistor 102 is represented by a bipolar junction transistor (BJT). Actually, the radio frequency transistor 102 may be a field effect transistor (FET). Under the circumstances of FET, the radio frequency transistor 102 may be a pseudo high electron mobility transistor (P-Hemt). When the radio frequency transistor 102 is a BJT, the control port 1023 is a base electrode. The first port 1021, namely the port for down conversion, is a transmitting electrode, and the second port 1022 is a collector electrode. When the radio frequency transistor 102 is a FET, the control port 1023 is a gate electrode. The first port 1021, namely the port for down conversion, is a source electrode, and the second port 1022 is a drain electrode.

Figure 4:
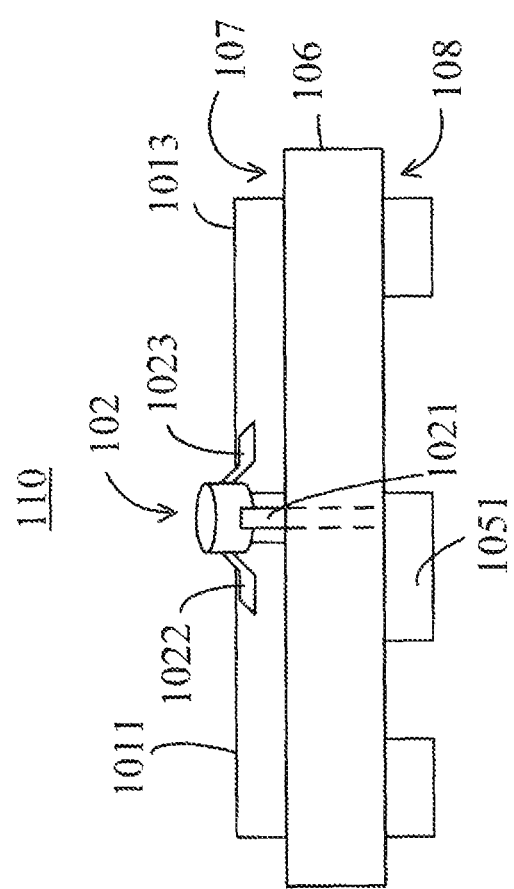
FIG. 4 is a transverse cross-sectional view of a structure of the active antenna module according to the present invention.
Figure 5:
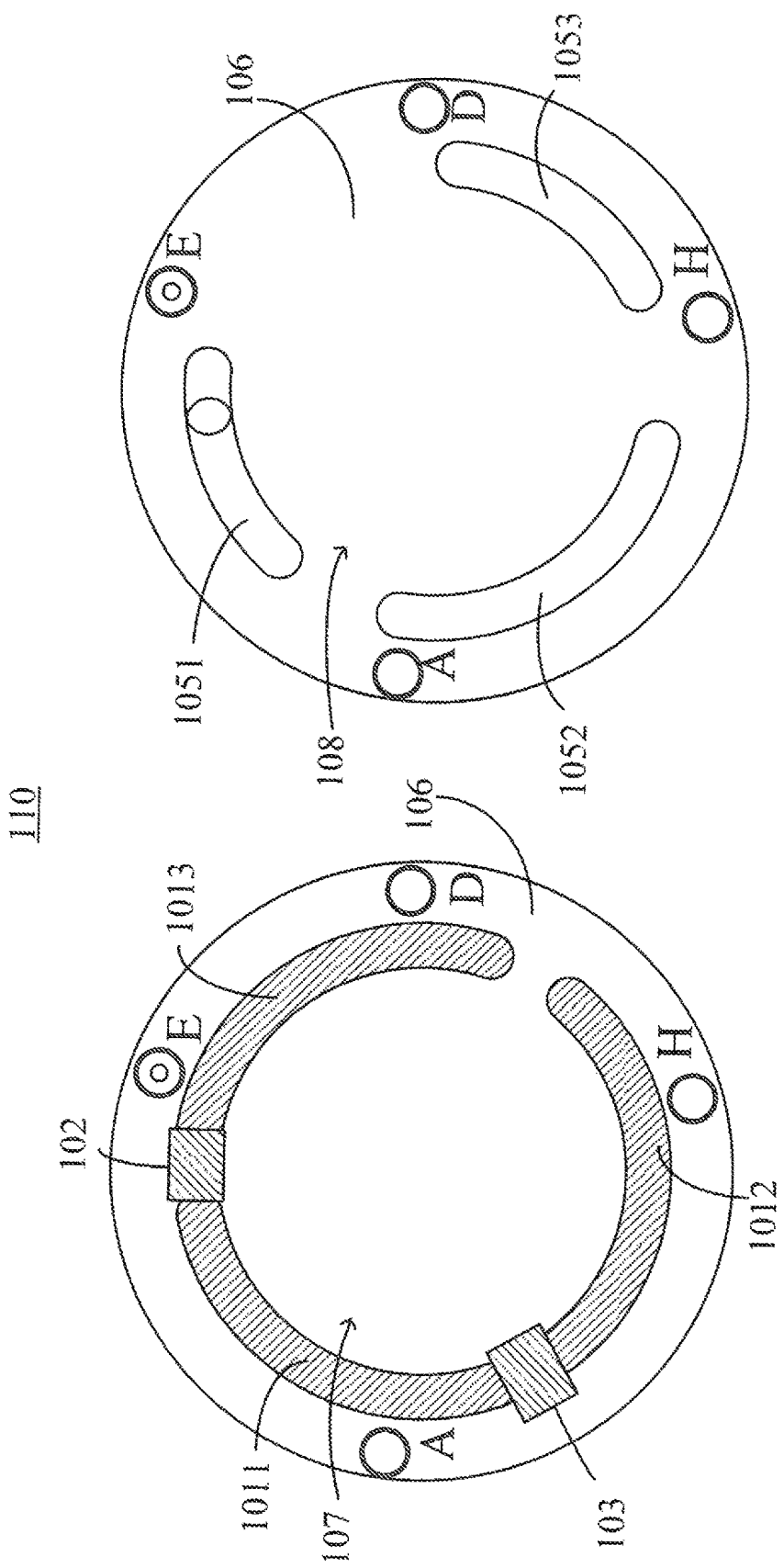
FIG. 5 shows structures on a front side and a back side of the active antenna module in FIG. 4.

Please refer to FIG. 4 and FIG. 5, FIG. 4 is a transverse cross-sectional view of a structure of the active antenna module according to the present invention. FIG. 5 shows structures on a front side and a back side of the active antenna module in FIG. 4. The active antenna module 110 comprises a first metal microstrip antenna 1011, a second metal microstrip antenna 1012, a third metal microstrip antenna 1013, a substrate 106, a radio frequency transistor 102, a first coupling metallic sheet 1051, a second coupling metallic sheet 1052, and a third coupling metallic sheet 1053. The first metal microstrip antenna 1011, the second metal microstrip antenna 1012, and the third metal microstrip antenna 1013 are disposed on a first surface 107 (that is the front side) of the substrate 106. The first coupling metallic sheet 1051, the second coupling metallic sheet 1052, and the third coupling metallic sheet 1053 are disposed on a second surface 108 (that is the back side) of the substrate 106. The first surface 107 and the second surface 108 are opposite faces of the substrate 106. The first metal microstrip antenna 1011, the second metal microstrip antenna 1012, the third metal microstrip antenna 1013, the substrate 106, the first coupling metallic sheet 1051, the second coupling metallic sheet 1052, and the third coupling metallic sheet 1053 constitute the loop antenna 101 shown in FIG. 2. The first metal microstrip antenna 1011, the second metal microstrip antenna 1012, the third metal microstrip antenna 1013, the first coupling metallic sheet 1051, the second coupling metallic sheet 1052, and the third coupling metallic sheet 1053 may be made of copper foils. The first port 1021, the second port 1022, and the control port 1023 of the radio frequency transistor 102 are respectively connected to the first coupling metallic sheet 1051, the first metal microstrip antenna 1011, and the third metal microstrip antenna 1013. The first port 1021 is a port for down conversion that is used as the output terminal for the intermediate frequency (baseband) demodulation signal. Through hole A, through hole H, through hole D, and through hole E all penetrate through the substrate 106, and conducting paths are formed by adhering copper foils on the through holes. The through hole A is connected to the first metal microstrip antenna 1011 and is an input terminal of an antenna power signal. That means, the antenna power line is input from the first metal microstrip antenna 1011 (equivalent to the first inductor L11 shown in FIG. 3). The through hole H is connected to the second metal microstrip antenna 1012 and is an input terminal for the modulation signal. That means, the through hole H is coupled to the modulating module 130 so that the modulation signal is input from the second metal microstrip antenna 1012 (equivalent to the second inductor L12 shown in FIG. 3), and the modulation signal is a triangular wave or a sine wave. The through hole D is connected to the third metal microstrip antenna 1013 and is an input terminal for a bias voltage for the radio frequency transistor 102. When the radio frequency transistor 102 is a FET, the through hole D may be connected to a fixed voltage (may be a ground terminal). The through hole E is connected to the first coupling metallic sheet 1051.

The active antenna module 110 further comprises the varactor 103 disposed on the first surface 107. Two ends of the varactor 103 are connected to the first metal microstrip antenna 1011 and the second metal microstrip antenna 1012. The capacitance value of the varactor 103 will change in accordance with the voltage applied across the two ends. The varactor 103 is used for tuning a FM signal when the active antenna module 110 is applied to the FM tuner or the FM modulation circuit.

Figure 6:
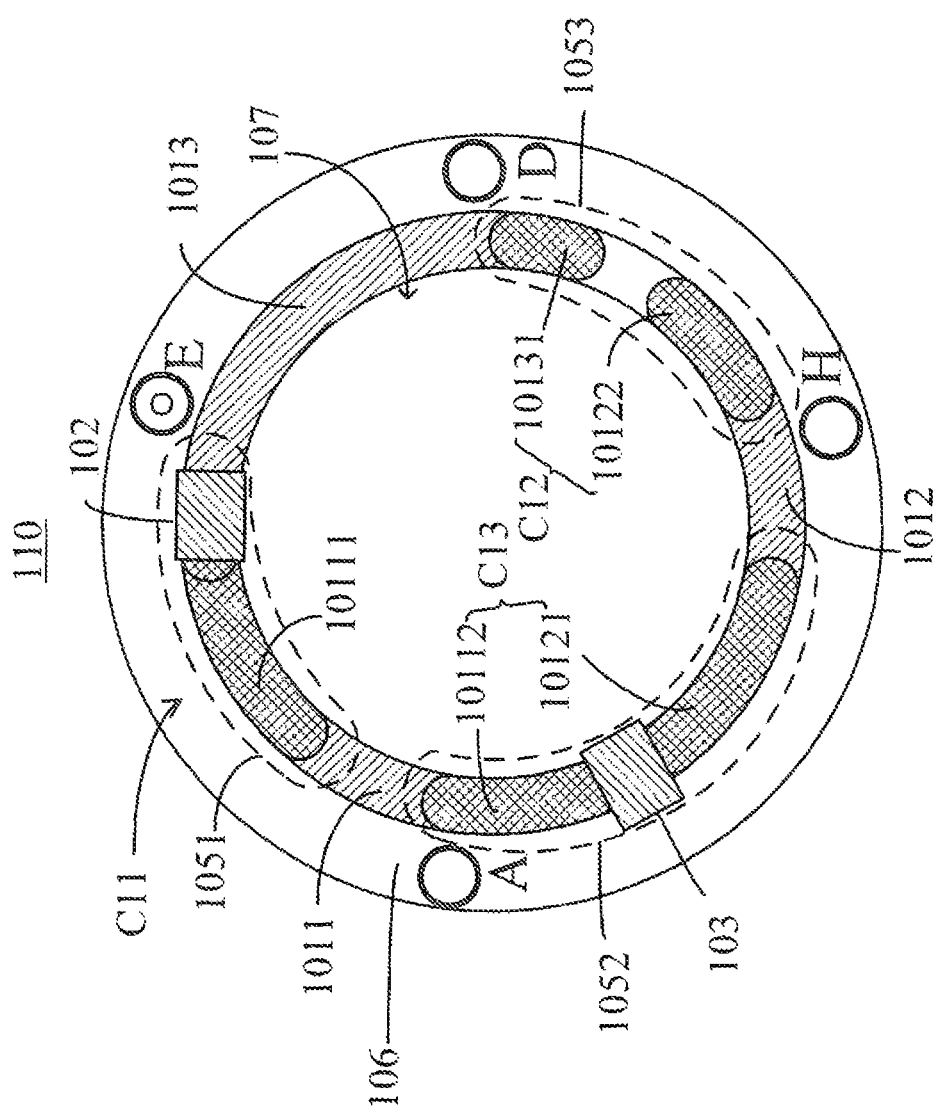
FIG. 6 is a front view of the structure of the active antenna module in FIG. 4.

Please refer to FIG. 6, FIG. 6 is a front view of the structure of the active antenna module in FIG. 4. A first portion 10111 of the first metal microstrip antenna 1011 overlaps the first coupling metallic sheet 1051 to form the first capacitor C12. A second portion 10112 of the first metal microstrip antenna 1011 and a first portion 10121 of the second metal microstrip antenna 1012 adjacent to the second portion 10112 of the first metal microstrip antenna 1011 overlap the second coupling metallic sheet 1052 to form the third capacitor C13. The first metal microstrip antenna 1011 is approximately in an arc shape, and the first portion 10111 and the second portion 10112 are located at both ends of the arcuate structure. A second portion 10122 of the second metal microstrip antenna 1012 and a first portion 10131 of the third metal microstrip antenna 1013 adjacent to the second portion 10122 of the second metal microstrip antenna 1012 overlap the third coupling metallic sheet 1053 to form the second capacitor C13. The second metal microstrip antenna 1012 is approximately in an arc shape, and the first portion 10121 and the second portion 10122 are located at both ends of the arcuate structure. The radio frequency transistor 102 is disposed on the first surface 107. The control port 1023 of the radio frequency transistor 102 is connected to the third metal microstrip antenna 1013.

When designing, the present invention loop antenna 101 must be analyzed through experimental verification. In other words, the present invention active antenna module 110 is transformed into the dual-port circuit shown in FIG. 2. Please also refer to FIG. 6, the circumference of the planar loop antenna 101 is approximately one half of the radio frequency wavelength ($\lambda/2 = 2\pi r$). Since the diameter measured from the outer margin of the first metal microstrip antenna 1011, the second metal microstrip antenna 1012, and the third metal microstrip antenna 1013 on the front side is 17.1 mm, the frequency should be higher than 2.79 GHz. However, as shown by the structure in FIG. 6, the copper foils on the back side really form equivalent metal coupling capacitors. Hence, the equivalent length of the LC tank is greater than the circumference, which is 17.1π (mm), to allow the antenna frequency to be reduced to below 2.79 GHz. Furthermore, the phase of the radio frequency transistor 102 is controlled. When the variously electrical phase delays inherently existing between the drain electrode and the gate electrode or the collector electrode and the base electrode of the radio frequency transistor 102 combine with the phase delay of the antenna at its operating frequency to make up the phase delay required by a positive feedback (180°), the optimized oscillation condition is achieved. Thus, as indicated by the experimental test result, the oscillation frequency is 2.3-2.4 GHz when AT41486 transistor is utilized as the oscillator. The oscillation frequency is 2.0-2.1 GHz when BFR92 transistor is utilized as the oscillator. The combinations of metal coupling capacitors and various transistors would therefore reduce the oscillation frequency of the antenna having its original size from 2.79 GHz to 2.0-2.1 GHz. As a result, the antenna size is shrunk to miniaturize the antenna.

It is worth noticing that the stability of the loop antenna 101 will be affected when adjusting the metal coupling capacitors. Take the BJT utilized as the radio frequency transistor 102 as an example, the lower the capacitance value of the equivalent metal coupling capacitor that is used as the first capacitor C11 is, the lower the internal impedance of the radio frequency transistor 102 is to increase the base current $I_B$, based on simple small-signal model equation of BJT. The increased base current $I_B$ will cause the collector current $I_C$ increase. Hence, the spectrum stability of the loop antenna 101 caused by radio frequency oscillation is improved. Furthermore, in the design shown in FIG. 2, the magnitude of the current must be considered when designing the oscillating sensor to ensure good operation. That means, the base current $I_B$, the transmitting current $I_E$, and the collector current $I_C$ must be considered when the radio frequency transistor 102 is a BJ. But when the radio frequency transistor 102 is a FET, the gate voltage $V_G$, the source current $I_S$, and the drain current $I_D$ must be considered. For example, special attention should be paid to the design because the transmitting current $I_E$ decides the radiation signal strength and consequently affects the sensing range directly. It is understandable that the operating point of the oscillator may be decided by the bias voltage. Theoretical value is very easy to find, but the optimized point must be obtained by experimental verification. The optimized point is found from the conditions having a signal to noise (S/N) ratio higher than the required S/N ratio.

In this structure, the desired equivalent inductance value and the desired equivalent capacitance value are achieved by selecting the first metal microstrip antenna sheet 1011, the second metal microstrip antenna sheet 1012, the third metal microstrip antenna sheet 1013, the first coupling metallic sheet 1051, the second coupling metallic sheet 1052, and the third coupling metallic sheet 1053. As mentioned previously, by designing the lengths of the metal coupling capacitors, the operating frequency of the loop antenna 101 is adjusted toward the lower frequency. In other words, the equivalent length for the half wavelength ($\lambda_g/2$) is elongated. In addition, the operating point of the radio frequency transistor 102 is adjusted to compensate the inadequate phase. Finally, the first metal microstrip antenna sheet 1011, the second metal microstrip antenna sheet 1012, the third metal microstrip antenna sheet 1013, the first coupling metallic sheet 1051, the second coupling metallic sheet 1052, and the third coupling metallic sheet 1053 are designed in a manner so that they are used as the resonator when the radio frequency transistor 102 resonates.

Please refer to FIG. 2 and FIG. 3 again, the operating frequency of the present invention loop antenna 101 is decided by the inductance value L of the loop antenna 101 (relevant to the lengths of the first metal microstrip antenna sheet 1011, the second metal microstrip antenna sheet 1012, and the third metal microstrip antenna sheet 1013) and the capacitance value C contributed by the first capacitor C11, the second capacitor C12, and the third capacitor C13 (relevant to the lengths of the first capacitor C11, the second capacitor C12, and the third capacitor C13). The larger the LC value is, the lower the radio frequency oscillation frequency is. Conversely, the smaller the LC value is, the higher the radio frequency oscillation frequency is. However, it is worth noticing that the radio frequency stability is closely related to the selection of the coupling capacitor and the bypass capacitor. When the radio frequency transistor 102 is a BJT, according to the simple small-signal model equation $I_C = \beta I_B$, the smaller the capacitance value of the first capacitor C11, the lower the internal impedance of the radio frequency transistor 102 is to cause the (value increase. That means, the collector current $I_C$ is increased to improve the radio frequency stability of the loop antenna 101. When the radio frequency transistor 102 is a FET, the simple small-signal model equation of FET is as follows:

$$I_D = I_{DSS}\left(1 - \frac{V_{GS}}{V_P}\right)^2,$$

where $V_P$ is the pinch-off voltage, $V_{GS}$ is the gate-source voltage, loss is the drain-source saturation current. The smaller the capacitance value of the first capacitor C11 is, the lower the internal impedance $r_{DS}$ of the radio frequency transistor 102 is. Since $V_{DS}=r_{DS}\times I_D$, the current $I_D$ is relatively increased under the circumstances of constant input voltage (the drain-source voltage $V_{DS}$ is a constant value).

In summary, in this circuit design, the lower the capacitance values of the first capacitors C11 is, the more stable the radio frequency oscillation is. That is, on the frequency spectrum distribution, the harmonic energy is decreased but the domain energy is increased. Conversely, the higher the capacitance values of the first capacitors C11 is, the less stable the radio frequency oscillation is. That is, on the frequency spectrum distribution, the harmonic energy is increased but the domain energy is decreased. As for the coupling capacitors C12, C13, their effects are just opposite to that of the first capacitor C11. The higher the capacitance values of the coupling capacitors C12, C13 are, the more stable the system is. That is, on the frequency spectrum distribution, the harmonic energy is decreased but the domain energy is increased. Conversely, the lower the capacitance values of the coupling capacitors C12, C13 are, the less stable the system is. That is, on the frequency spectrum distribution, the harmonic energy is increased but the domain energy is decreased.

When the structure of the equivalent model shown in FIG. 3 is compared with a standard radar structure, metal (or copper foil) on the front side and metal (or copper foil) on the back side are equivalent to the loop antenna structure if it is equivalent to a standard radar antenna. In addition, when it is used as a voltage controlled oscillator, the loop antenna and the metal stripes are respectively equivalent to the equivalent inductor (L) and the equivalent capacitor (C), and together constitute the resonant cavity of the transistor. In the present invention active antenna module 110, the radio frequency transistor 102 also has the functions of the voltage controlled oscillator and the mixer. The first metal microstrip antenna sheet 1011, the second metal microstrip antenna sheet 1012, the third metal microstrip antenna sheet 1013, the first coupling metallic sheet 1051, the second coupling metallic sheet 1052, and the third coupling metallic sheet 1053 are designed in a manner so that they are used as the resonator when the radio frequency transistor 102 resonates. When it is used as the mixer, the bias voltage applied to the base is utilized for driving the radio frequency transistor 102 to operate near the saturation region so as to detect the intermediate frequency signal at the emitter.

Given that the active antenna module 110 and the RF transistor 102 function as a mixer, the RF transistor 102 and the first intermediate-frequency filter 120 can serve as demodulators to demodulate the first and the second FMCW signals, so to recover a carrier signal and extract the first demodulating signal. In other words, the first demodulating signal outputted by the first intermediate-frequency filter 120 is a signal directly extracted and magnified from the modulation frequency $f_m$. The amplitude of the first demodulating signal is close to the boundary of the direct current (DC) bias.

Figure 7A:
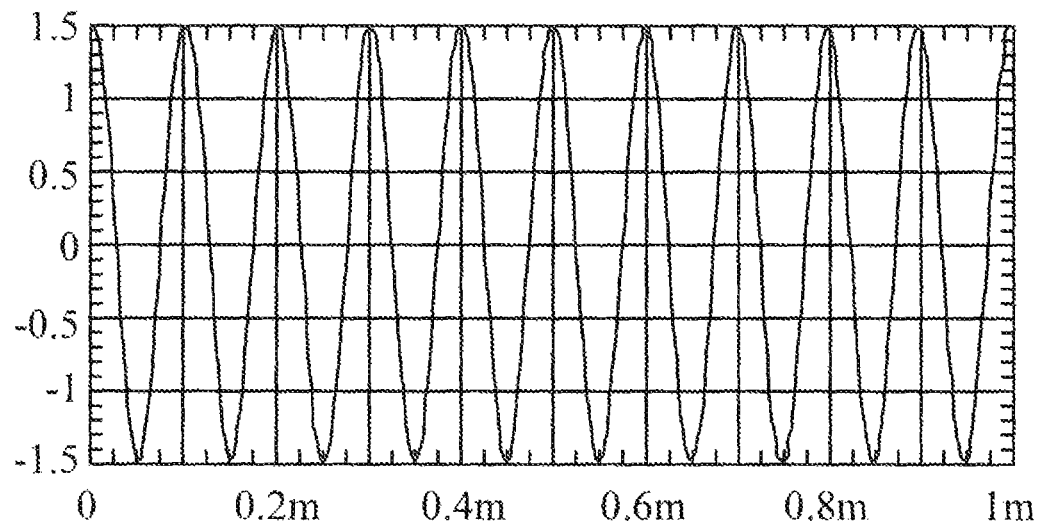
FIGS. 7A and 7B respectively show the waveforms of time domain response and frequency response of the first demodulating signal outputted by the first intermediate-frequency filter when a parking space is not taken.
Figure 7B:
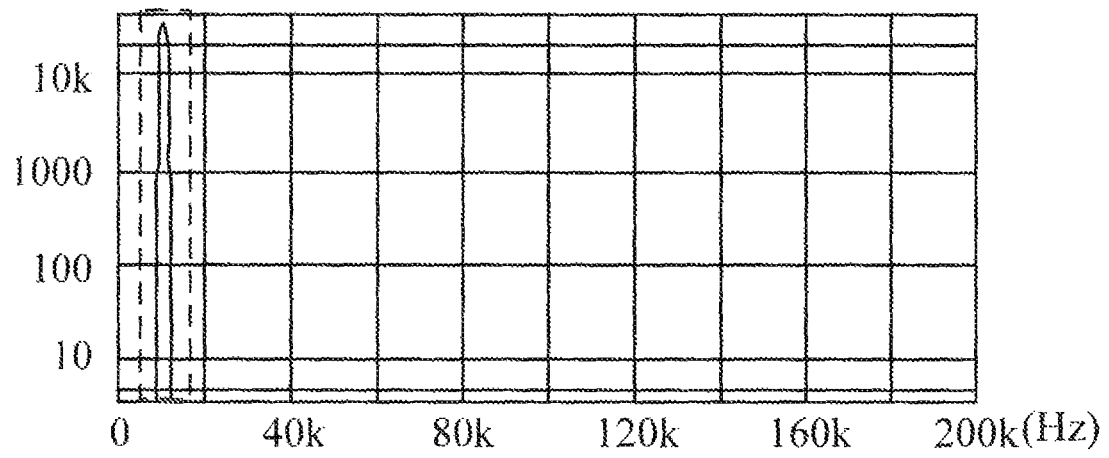

Please refer to FIGS. 7A and 7B. FIGS. 7A and 7B respectively show the waveforms of time domain response and frequency response of the first demodulating signal outputted by the first intermediate-frequency filter 120 when a parking space is not taken. When the parking space 50 is not occupied by a car, the first demodulating signal is in a sinusoid wave, and its frequency is the modulation frequency $f_m$.

Figure 8A:
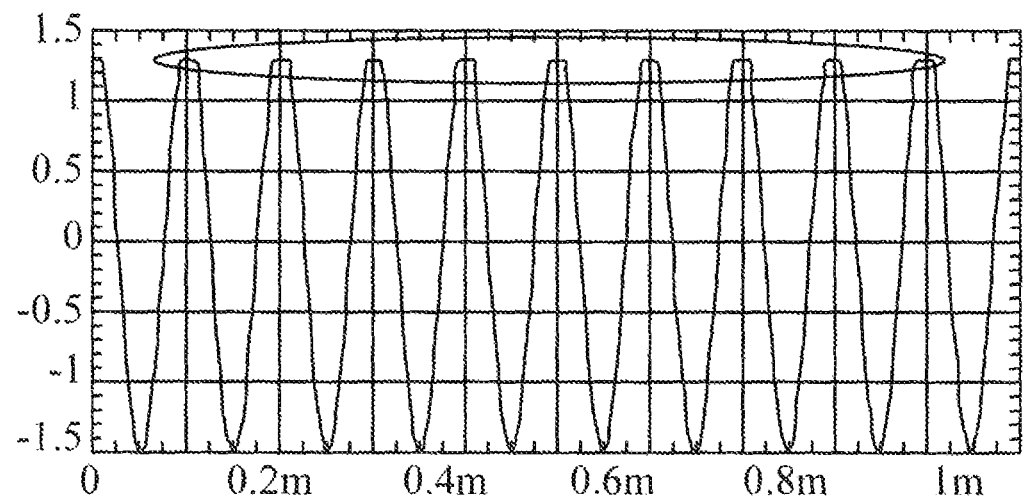
FIGS. 8A and 8B respectively show the waveforms of time domain response and frequency response of the first demodulating signal outputted by the first intermediate-frequency filter when a parking space is taken.
Figure 8B:
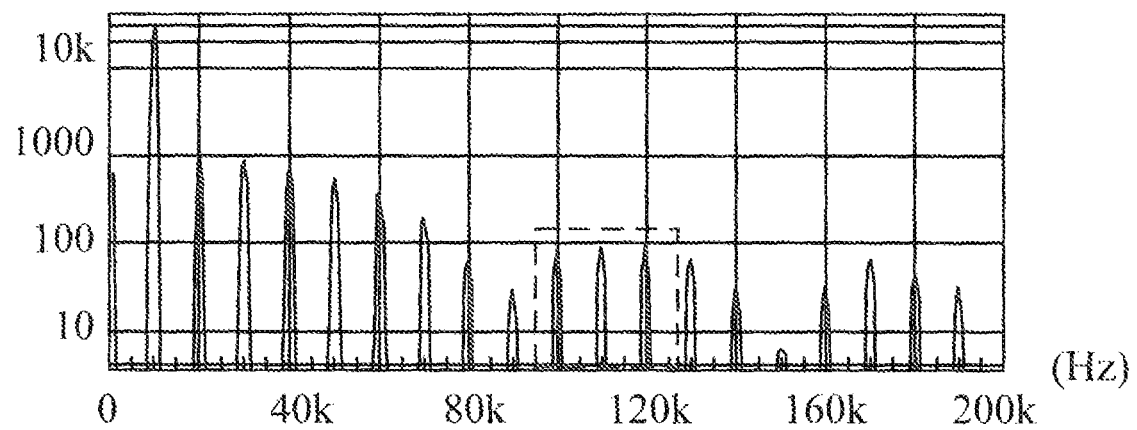
Figure 9:
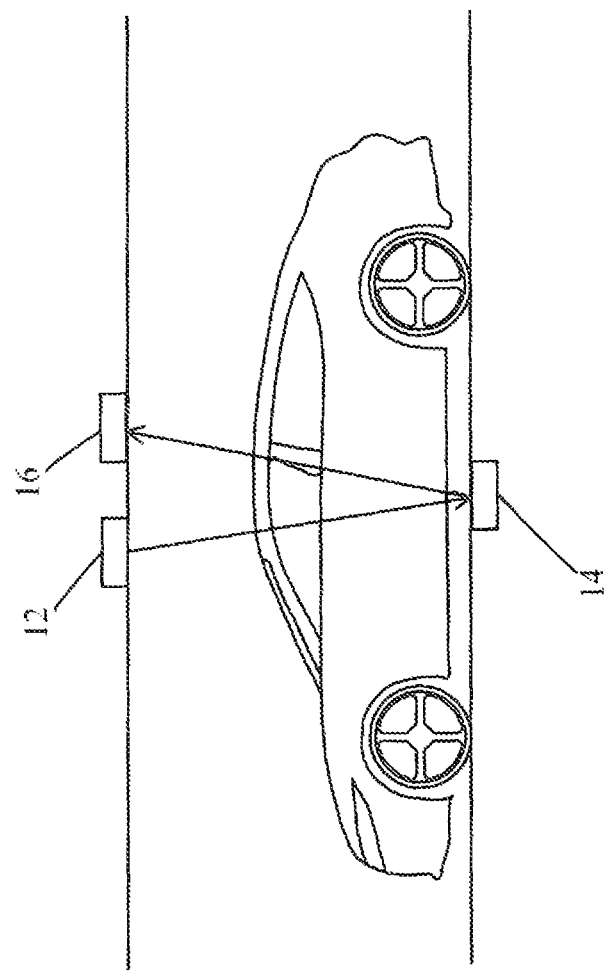
FIG. 9 shows a schematic diagram of how the existing technology detects a parking space.

Please refer to FIGS. 8A and 8B. FIGS. 8A and 8B respectively show the waveforms of time domain response and frequency response of the first demodulating signal outputted by the first intermediate-frequency filter 120 when a parking space is taken. When the parking space 50 is occupied by a car, which reflects the near field signals, the upper part of the sinusoid wave of the first demodulating signal is cut and thus the wave is distorted. The distorted sinusoid wave, after a fast Fourier transform, generates many harmonics on its frequency domain.

The FIG. 7B and FIG. 8B show that when the parking space 50 is occupied by a car, many harmonics appear on the frequency domain of the first demodulating signal. Therefore, the second intermediate-frequency filter 140 is used to extract the second demodulating signal form the first demodulating signal, with the triggering frequency of the second demodulating signal being a multiplying frequency of the modulation frequency fn. Preferably, the triggering frequency is eight to ten times the frequency band of the modulation frequency. That is, the frequency of the second demodulating signal extracted by the second intermediate-frequency filter 140 is eight to ten times of the modulation frequency $f_m$. Because high-order harmonics have lower energy, the magnification can be done by higher multiples, so to increase the signal to noise ratio (SNR) of the frequency point to other frequencies.

Next, the integrator 150 performs integral operation to the second demodulating signal to output an integral voltage. The triggering circuit 160, electrically connecting the integrator 150, outputs a triggering voltage when the integral voltage of the second demodulating signal is larger than a reference voltage. When the parking space 50 is not occupied by a car, the extracted second demodulating signal hardly comprises any harmonic whose frequency is within the $8\times f_m$-to-$10\times f_m$ range. On the contrary, when the parking space 50 is occupied by a car, the extracted second demodulating signal comprises harmonics whose frequency is within the $8\times f_m$-to-$10\times f_m$ range. Therefore, when the parking space 50 is occupied, the integral voltage generated through the integral operation performed by the integrator 150 to the second demodulating signal is larger than the reference voltage. The triggering circuit 160 is thus triggered to output the triggering voltage to the controller 170.

Please refer to FIG. 2. When receiving the triggering voltage, the controller 170 controls an operation of a back end circuit 190 at a subsequent stage, such as the emission of LED light or sounding of an alarm, to execute the operation signaling that the parking space 150 is taken. In addition, when the controller 170 receives the triggering voltage, it outputs a control signal to the switch 180. When the switch 180, electrically connects the modulating module 130 and the controller 170, receives the control signal, the modulating module 130 temporarily stops sending the sinusoid wave within a predetermined time frame. Preferably, when the switch 180 receives the control signal, the modulating module 130 outputs a voltage of direct current within the predetermined time frame. At this moment, the active antenna module 110 switches from outputting FMCW signals to continuous wave signals. This is meant to shy away from the frequency band of wireless communication modules (e.g. bluetooth, Zigbee and WiFi), so that wireless communication modules can smoothly communicate with back-end systems or mainframe cloud, and not subject to the interference and influence of the radiative signals of the sensor 100. Manufacturers can define the time frame freely, e.g. 10 seconds.

The sensor for detecting a parking space of the present invention adopts a miniature microwave sensor and applies it to object detection within an extremely short distance (within one meter). Given that the sensor integrates the oscillator, mixer and antenna of a RF module into one, the RF transceiver is further simplified and reduced in size. Meanwhile, the VCO and mixer is substituted by a BJT or FET (e.g. P-Hemt), significantly improves the size and power consumption. Therefore, the sensor for detecting a parking space of the present invention can easily integrate with the circuit of the existing solar-powered lighting equipment outdoors and serves as a parking space detector for outdoor parking lots or on-street parking areas. It helps to achieve smart parking management and application in urban areas.

In addition, the modulating module of the present invention outputs a modulation signal generated by sinusoid waves. The Bessel function of the modulation signal generated by taking sinusoid wave frequency as the modulation frequency comprises the distribution of odd-order terms and even-order terms. A saturated high-order distortion harmonic of the first demodulating signal generated by demodulating the modulation frequency can demodulate a second demodulating signal. The present invention adopts the second demodulating signal as the basis for object detection, which is different from the short-distance detection of the conventional FMCW. The sensor for detecting parking space is not interfered by weather conditions or environmental factors indoors or outdoors, and can provide an accurate detection method so that drivers can easily know which parking space is empty.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensor for detecting a parking space, comprising:
    a modulating module, for providing sinusoid waves having a modulation frequency;
    an active antenna, electrically connected to the modulating module, for transmitting a first frequency-modulated continuous wave (FMCW) signal based on the modulation frequency, and receiving a second FMCW signal that is reflected back;
    a first intermediate-frequency filter, electrically connected to the active antenna module, for extracting a first demodulating signal form the second FMCW signal, with the first demodulating signal having the modulation frequency;
    a second intermediate-frequency filter, electrically connected to the first intermediate-frequency filter, for extracting a second demodulating signal from the first demodulating signal, with the second demodulating signal having a triggering frequency being a multiplying frequency of the modulation frequency;
    an integrator, electrically connected to the second intermediate-frequency filter, for performing integral operation to the second demodulating signal to output an integral voltage;
    a triggering circuit, electrically connected to the integrator, for outputting a triggering voltage when the integral voltage of the second demodulating signal is larger than a reference voltage; and
    a controller, electrically connected to the triggering circuit, for executing the operation signaling a parking space is taken when receiving the triggering voltage.

2. The sensor for detecting a parking space of claim 1, wherein the active antenna module comprises:
    a loop antenna, comprising a transmitting terminal for transmitting the first FMCW signal and a receiving terminal for transmitting the second FMCW signal; and
    a radio frequency (RF) transistor, comprising a controlling port, a first port, and a second port, the second port being coupled to the transmitting terminal, the controlling terminal being coupled to the receiving terminal, and signal applied on the controlling terminal being an inversed phase of signal applied on the second port.

3. The sensor for detecting a parking space of claim 2, wherein the RF transistor is a bipolar junction transistor (BJT), the controlling port is a base, the first port is an emitter, and the second port is a collector.

4. The sensor for detecting a parking space of claim 2, wherein the RF transistor is a field effect transistor (FET), the FET comprises a P-Hemt, the controlling port is a gate, the first port is a source, and the second port is a drain.

5. The sensor for detecting a parking space of claim 2, wherein the microwave sensor further comprises a first capacitor, the first capacitor comprises two terminals bridging over the first port and the second port of the RF transistor, and the loop antenna comprises:
    a first inductor, coupled to the second port of the RF transistor;
    a second inductor;
    a third inductor, coupled to the controlling port of the RF transistor;
    a second capacitor, coupled between the first inductor and the second inductor; and
    a third capacitor, coupled between the second inductor and the third inductor.

6. The sensor for detecting a parking space of claim 2, wherein the active antenna module comprises:
    a substrate comprising a first surface and a second surface facing against the first surface;
    a first metal microstrip antenna, disposed on the first surface of the substrate;
    a second metal microstrip antenna, disposed on the first surface of the substrate;
    a third metal microstrip antenna, disposed on the first surface of the substrate;
    a first coupling metallic sheet, disposed on the second surface of the substrate;
    a second coupling metallic sheet, disposed on the second surface of the substrate; and
    a third coupling metallic sheet, disposed on the second surface of the substrate;
    the RF transistor, disposed on the first surface of the substrate, the controlling port of the RF transistor being connected to the third metal microstrip antenna, and the first port and the second port being connected to the first coupling metallic sheet and the first metal microstrip antenna, respectively;
    wherein a first part of the first metal microstrip antenna and the first coupling metallic sheet form a first capacitor, a second part of the first metal microstrip antenna, a first part of the second metal microstrip antenna adjacent to the first part of the first metal microstrip antenna, and the second coupling metallic sheet form a third capacitor, a second part of the second metal microstrip antenna, the third metal microstrip antenna adjacent to the second part of the second metal microstrip antenna, and the third coupling metallic sheet form a third capacitor.

7. The sensor for detecting a parking space of claim 1, wherein the triggering frequency is eight to ten times the frequency band of the modulation frequency.

8. The sensor for detecting a parking space of claim 1, located on the surface of the parking lot, or maintaining a predetermined distance above the parking lot.

9. The sensor for detecting a parking space of claim 1, further comprising a switch that electrically connects the modulating module and the controller, which outputs a control signal when receiving the triggering voltage; the switch controls the modulating module to temporarily stop outputting the sinusoid wave when receiving the control signal.

10. The sensor for detecting a parking space of claim 9, wherein the switch, when receiving the control signal, switches the modulating module to output a voltage of direct current.

* * * * *